(12) United States Patent
Zheng et al.

(10) Patent No.: US 7,693,383 B2
(45) Date of Patent: Apr. 6, 2010

(54) SILICON-CONTAINING POLYMERS AND POLYMERS AND OPTICAL WAVEGUIDES FORMED THEREFROM

(75) Inventors: Hai Bin Zheng, Holden, MA (US); Philip D. Knudsen, Northboro, MA (US); James G. Shelnut, Lancaster, MA (US)

(73) Assignee: Rohm and Haas Electronics Materials, Marlborough, MA (US)

( * ) Notice: Subject to any disclaimer, the term of this patent is extended or adjusted under 35 U.S.C. 154(b) by 419 days.

(21) Appl. No.: 11/598,872

(22) Filed: Nov. 14, 2006

(65) Prior Publication Data

US 2007/0107629 A1    May 17, 2007

Related U.S. Application Data

(60) Provisional application No. 60/736,367, filed on Nov. 14, 2005.

(51) Int. Cl.
G02B 6/10 (2006.01)

(52) U.S. Cl. .................. 385/129; 385/130; 385/131; 385/141; 385/142; 385/143; 385/144; 385/145; 528/23; 528/33; 528/34; 528/14

(58) Field of Classification Search ......... 385/129–131, 385/141–145; 528/23, 33, 34, 14
See application file for complete search history.

(56) References Cited

U.S. PATENT DOCUMENTS

| | | | | |
|---|---|---|---|---|
| 5,498,642 A | * | 3/1996 | Chu et al. | 522/99 |
| 5,650,474 A | * | 7/1997 | Yamaya et al. | 528/12 |
| 6,632,585 B1 | | 10/2003 | Nakamura | |
| 6,842,577 B2 | | 1/2005 | Shelnut et al. | |
| 2002/0137870 A1 | | 9/2002 | Crivello | |
| 2004/0017994 A1 | * | 1/2004 | Kodama et al. | 385/141 |
| 2005/0033001 A1 | | 2/2005 | Cella et al. | |
| 2005/0111808 A1 | | 5/2005 | Shelnut et al. | |
| 2005/0141839 A1 | | 6/2005 | Shelnut et al. | |
| 2006/0133755 A1 | | 6/2006 | Shelnut et al. | |
| 2006/0133756 A1 | | 6/2006 | Shelnut et al. | |
| 2006/0133766 A1 | | 6/2006 | Shelnut et al. | |

FOREIGN PATENT DOCUMENTS

| | | |
|---|---|---|
| EP | 1 650 250 A1 | 4/2006 |
| GB | 2 230 018 | 10/1990 |
| JP | 57 179805 A | 11/1982 |
| JP | 57179805 A | 11/1982 |
| WO | WO 03/010565 | 2/2003 |
| WO | WO 2005/077960 A1 | 8/2005 |
| ZA | 9706079 | 7/1997 |

OTHER PUBLICATIONS

European Search Report of corresponding European Patent Application No. 06 25 5807 mailed Apr. 23, 2008.
Lyu et al., "Effect of the linear siloxane chain in cyclic silsesquioxane (CSSQ) on the mechanical/electrical property of the thin films", European Polymer Journal 40 (2004), pp. 2505-2512.

* cited by examiner

*Primary Examiner*—Randy Gulakowski
*Assistant Examiner*—Olatunde S Ojurongbe
(74) *Attorney, Agent, or Firm*—Jonathan D. Baskin

(57) ABSTRACT

Provided are polymers comprising the condensation product of silicon-containing reactants. Also provided are compositions suitable for use in forming optical waveguides which include such polymers, as well as optical waveguides formed from such polymers. The polymers, compositions and optical waveguides have particular use in the formation of printed wiring boards having electrical and optical functionality.

11 Claims, 1 Drawing Sheet

SILICON-CONTAINING POLYMERS AND POLYMERS AND OPTICAL WAVEGUIDES FORMED THEREFROM

Figure 1:
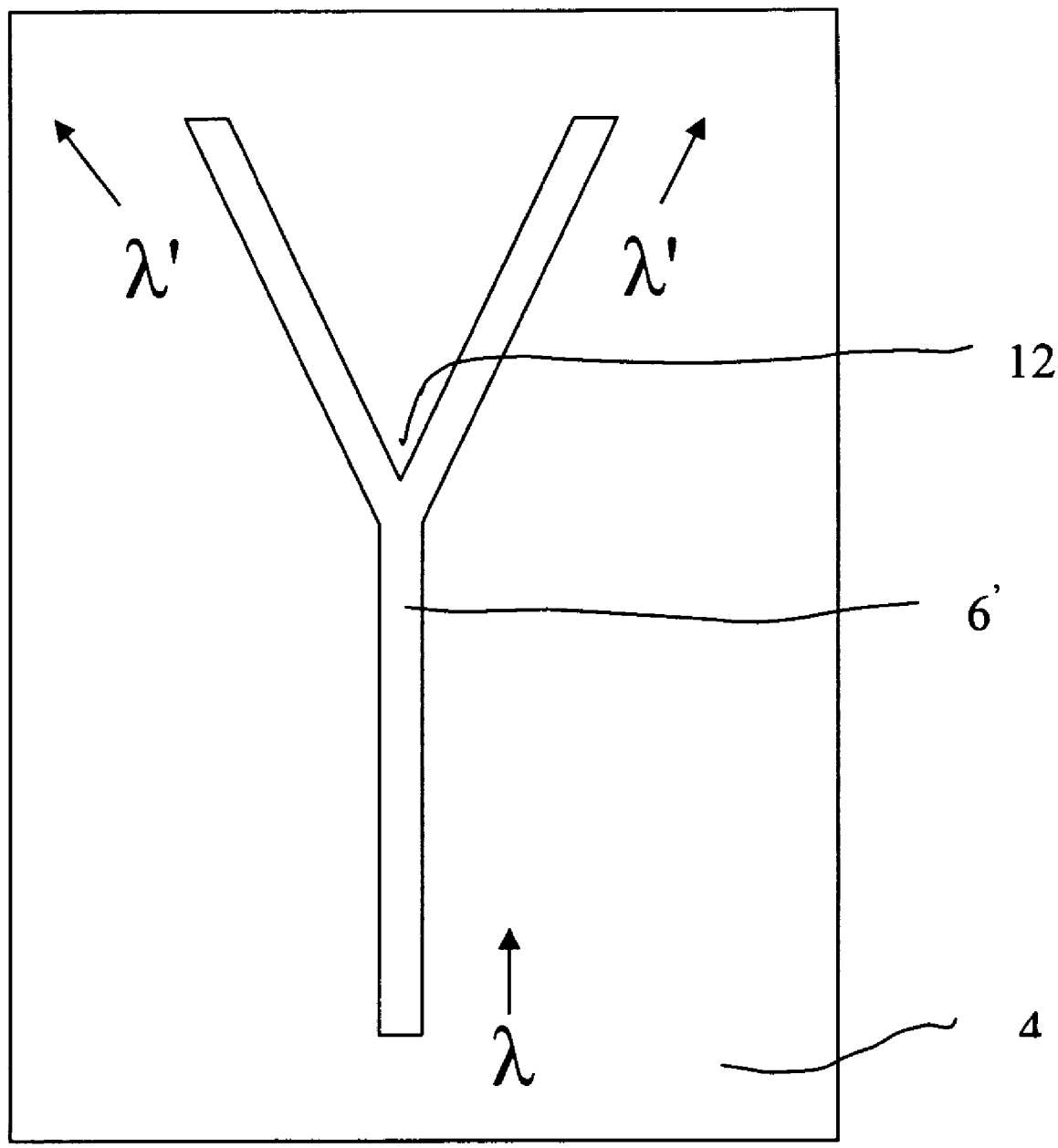

The present invention relates generally to the field of silicon-containing polymers, and more specifically to silsesquioxane polymers. The polymers of the invention find particular applicability in the formation of optical layers and optical elements such as optical waveguides.

The incorporation of polymeric optical layers in the form of embedded optical waveguides into printed wiring boards is known. For example, U.S. Application Publication Nos. 20050111808A1 and 20050141839A1, to Shelnut et al, disclose embedded optical waveguides formed using silsesquioxane chemistry on an electronic substrate such as a printed wiring board substrate or a semiconductor wafer. The optical waveguides include a core and a clad surrounding the core, with optical radiation propagating in the core due to the core's higher index of refraction as compared to the clad. Embedded optical waveguides are typically formed by coating a bottom clad layer over a substrate, coating a core layer over the bottom clad layer, patterning the core layer to form a core structure, and forming a top clad layer over the bottom clad layer and core structure. The bottom clad, core and top clad layers may be formed from compositions in liquid form which include solvent and polymer components.

When waveguides are incorporated into printed wiring boards such as circuit backplanes used in server devices, they are subjected to thermal stresses resulting from exposure to a variety of thermal conditions. These conditions can result in cracking and lifting defects in the core and/or cladding materials, increasing optical losses and rendering the waveguides unusable. This has been observed in the case of certain silsesquioxane-based polymer waveguide systems, which are typically brittle. Telcordia GR-1221-CORE 6.2.7 (January 1999) is a standard thermal cycling test for reliability characterization of optical waveguides. Silicon-based waveguide systems have been proposed in which the polymer is made flexible by use of a flexibilizing additive in the waveguide composition and/or incorporation of polymerized units of a flexibilizing monomer into the polymer itself. Such systems are disclosed, for example, in the aforementioned published patent applications to Shelnut et al. These documents address issues regarding coating flexibility but do not recognize the thermal cycling requirements of the coated waveguide layers. Optical waveguides having improved reliability when exposed to such thermal variations are therefore desired. A1

A first aspect of the invention provides a polymer which includes a condensation product of reactants comprising a first reactant of the formula $RSi(OR^1)_3$ and a second reactant of the formula $R^2O(R^3{}_2Si—O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more.

A second aspect of the invention provides a composition suitable for use in forming an optical waveguide. The composition includes: a polymer including a condensation product of reactants which include a first reactant of the formula $RSi(OR^1)_3$ and a second reactant of the formula $R^2O(R^3{}_2Si—O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more; and a component for altering the solubility of the composition upon activation.

A third aspect of the invention provides an optical waveguide. The optical waveguide includes a core and a clad. The core and/or the clad are formed from a composition that includes a polymer including a condensation product of reactants which include a first reactant of the formula $RSi(OR^1)_3$ and a second reactant of the formula $R^2O(R^3{}_2Si—O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more.

A fourth aspect of the invention provides a dry-film formed from the above-described composition. The dry-film includes: a releasable carrier substrate having a front surface and a back surface; and a polymeric layer over the front surface of the carrier substrate, comprising a condensation product of reactants comprising a first reactant of the formula $RSi(OR^1)_3$ and a second reactant of the formula $R^2O(R^3{}_2Si—O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more; and a component for altering the solubility of the composition upon activation.

A fifth aspect of the invention provides an electronic device which includes a waveguide such as described above. The electronic device may be, for example, a printed wiring board having electrical and optical functionality.

The present invention will be discussed with reference to the following drawing, in which:

FIG. 1 illustrates an exemplary optical waveguide in accordance with one aspect of the invention.

The present invention provides silicon-containing polymers and compositions that include such polymers. The polymers and compositions are suitable for use in forming optical waveguides and devices made therefrom. Unless otherwise specified, amounts for components of the composition are given in weight % based on the composition absent any solvent. As used herein, the term "polymer" includes oligomers, dimers, trimers, tetramers and the like, and encompasses homopolymers and higher order polymers, i.e., polymers formed from two or more different monomer units and heteropolymers. The term "alkyl" refers to linear, branched and cycloalkyl groups, which are substituted or unsubstituted and can include heteroatoms in or on the chain. The term "aromatic" refers to aromatic groups, which are substituted or unsubstituted and can include heterocycles. The term "aralkyl" refers to groups containing both alkyl and aryl constituents, which are substituted or unsubstituted and can include heteroatoms or heterocycles, respectively. The terms "a" and "an" mean "one or more" unless otherwise indicated. The term "in a dried state" means a composition containing 10 wt % or less of a solvent, based on the entire composition. The term "wherein the solubility of the composition in a dried state is alterable" means that the solubility of the composition is alterable for any (not necessarily every) solvent content in the range of 10 wt % or less. A2

The polymer includes the condensation product of reactants comprising a first reactant of the formula $RSi(OR^1)_3$ and a second reactant of the formula $R^2O(R^3{}_2Si—O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more. One or more additional reactants for the condensation reaction may be used. For example, the reactants may further include a third reactant of the formula $R^5Si(OR^6)_3$, wherein $R^5$ and $R^6$ are chosen from substituted and unsubstituted aliphatic, aromatic, and aralkyl groups, and wherein R and $R^5$ are different.

The polymers useful in the present invention include, for example, ladder-type silsesquioxanes, random structured silsesquioxanes and caged silsesquioxanes as well as straight chain siloxane oligomers and combinations thereof. Exemplary organic groups for R, $R^1$, $R^2$, $R^3$, $R^4$, $R^5$ and $R^6$ include substituted and unsubstituted alkyl, aryl and heterocyclic groups. The alkyl groups can be straight chain, branched or cyclic having, for example, from 1 to 20 carbon atoms, and typically have from 1 to 20 carbon atoms, such as methyl, ethyl, propyl, isopropyl, t-butyl, t-amyl, octyl, decyl, dodecyl, cetyl, stearyl, cyclohexyl, and 2-ethylhexyl. The alkyl groups can be substituted. "Substituted" means that one or more hydrogen atoms on the side chain groups is replaced by another substituent group, for example, deuterium, halogen such as fluorine, bromine, and chlorine, ($C_1$-$C_6$)alkyl, ($C_1$-$C_6$)haloalkyl, ($C_1$-$C_{10}$)alkoxy, ($C_1$-$C_{10}$)alkylcarbonyl, ($C_1$-$C_{10}$)alkoxycarbonyl, ($C_1$-$C_{10}$)alkylcarbonyloxy, alkylamine, alkylsulfur containing materials, and the like. The alkyl groups can be substituted with heteroatoms in and/or on the alkyl chain, for example, or can be non-aromatic cyclic groups such as cyclopentyl, cyclohexyl, norbonyl, adamantly, piperidinyl, tetrahydrofuranyl and tetrahydrothiophenyl groups. Exemplary aryl groups include those having from 6 to 20 carbon atoms, for example, from 6 to 15 carbon atoms, such as phenyl, tolyl, benzyl, 1-naphthyl, 2-naphthyl and 2-phenanthryl, and can be substituted with heteroatoms. Heterocyclic groups can be aromatic, for example, thiophene, pyridine, pyrimidine, pyrrole, phosphole, arsole, and furane.

In order to reduce the possibility of gellation during polymer synthesis, R is free of hydrolyzable groups such as —Si($OR^7$), wherein $R^7$ is as described above with respect to $R^1$ to $R^6$. Such gellation is believed to be detrimental to polymer and compositional characteristics, for example, solubility in coating and developing solvents and coatability. Where more than one reactant of the formula $RSi(OR^1)_3$ based on R is present such as the optional third reactant described above, R for each such reactant (e.g., $R^6$) may be free of hydrolyzable groups.

Typical for R, $R^5$ and $R^6$ are substituted or unsubstituted methyl, ethyl, propyl, cyclopentyl, cyclohexyl, benzyl, phenyl, phenethyl, adamantyl groups, and combinations thereof. Typical for $R^1$, $R^2$, and $R^4$ are substituted or unsubstituted methyl, ethyl, propyl, cyclopentyl, cyclohexyl groups and combinations thereof. Typical for $R^3$ are substituted or unsubstituted methyl, ethyl, propyl, cyclopentyl, and cyclohexyl groups, and x is typically from 2 to 10.

The formed polymer can contain, for example, an alkyl silicon polymer such as a copolymer containing methyl silsesquioxane units and tetramethyldisiloxane units; an aryl silicon polymer such as a copolymer containing phenyl silsesquioxane units and hexamethyltrisiloxane units or an aralkyl silicon copolymer such as a copolymer containing methyl and phenyl silsesquioxane units, as well as tetramethyldisiloxane units. A3

The described polymers can be prepared by known methods with readily available starting materials. Such known methods include, for example, condensing the desired condensation reactants with a catalytic amount of acid in the presence of water. The units to be condensed in the polymer may be present in various ratios. For example, the R—Si($OR^1$)$_3$ reactant together with the optional $R^5Si(OR^6)_3$ reactants may be present in an amount of from 70 to 99 wt %, while the $R^2O(R^3{}_2Si$—O)$_xR^4$ reactant may be present in the amount of from 1 to 30 wt % Additional condensation reactants, for example, $R^5Si(OR^6)_3$, are typically present in an amount of from 10 to 90 wt %.

The polymers of the invention may be used to form compositions useful in the formation of optical waveguides. Such compositions can advantageously be made photosensitive. The compositions are prepared from the polymer and further include a component for altering the solubility of the composition upon activation. The solubility of the composition in a dried state is alterable upon activation of the component such that the composition is developable in a developer solution.

The polymer is typically present in the composition in an amount of from 1 to 99.5 wt %, for example from 60 to 98.5 wt %. The polymers may contain a wide range of repeating units, either random or block. The polymer units useful in the present invention may have, for example, from 5 to 150 repeating units, typically from about 10 to 35 repeating units; and the siloxane units useful in the present invention may have for example from 5 to 150 repeating units, typically from about 7 to 25 repeating units. Thus, the polymer may vary widely in molecular weight. Typically, the polymers have a weight average molecular weight ($M_w$) of from about 500 to 15,000, more typically from about 1000 to 10,000, even more typically from about 1000 to 5000. It has been found that the dissolution rate of the compositions in accordance with the invention in an aqueous developer decreases with an increase in the molecular weight $M_w$ and number average molecular weight $M_n$.

A component is present in the composition for altering the solubility of the composition upon activation. This component allows the composition to be alterable in its solubility in a developer. In the case of a negative working material, it is thought that the active component catalyzes coupling of exposed portions of the polymer composition, rendering the coupled portions insoluble in a developer solution. The active component typically generates an acid or base upon activation. A wide variety of active components may be used in the present invention, including, but not limited to, photoacid generators, photobase generators, thermal acid generators and thermal base generators. Of these, photoacid and thermal acid generators, components generating an acid upon activation, are typical.

The photoacid generators useful in the present invention can be any compound or compounds which generate acid upon exposure to light. Suitable photoacid generators are known and include, but are not limited to, halogenated triazines, onium salts, sulfonated esters, substituted hydroxyimides, substituted hydroxylimines, azides, naphthoquinones such as diazonaphthoquinones, diazo compounds, and combinations thereof.

Particularly useful halogenated triazines include, for example, halogenated alkyl triazines such as the trihalomethyl-s-triazines. The s-triazine compounds are condensation reaction products of certain methyl-trihalomethyl-s-triazines and certain aldehydes or aldehyde derivatives. Such s-triazine compounds may be prepared according to the procedures disclosed in U.S. Pat. No. 3,954,475 and Wakabayashi et al., *Bulletin of the Chemical Society of Japan*, 42, 2924-30 (1969). Other triazine type photoacid generators useful in the present invention are disclosed, for example, in U.S. Pat. No. 5,366,846.

Onium salts with weakly nucleophilic anions are particularly suitable for use as photoacid generators in the present invention. Examples of such anions are the halogen complex anions of divalent to heptavalent metals or non-metals, for example, antimony, tin, iron, bismuth, aluminum, gallium, indium, titanium, zirconium, scandium, chromium, hafnium, copper, boron, phosphorus and arsenic. Examples of suitable onium salts include, but are not limited to, diazonium salts such as diaryl-diazonium salts and onium salts of group VA, VIA and VIIA of the Periodic Table, for example, halonium salts such as iodonium salts, quaternary ammonium, phosphonium and arsonium salts, sulfonium salts such as aromatic sulfonium salts, sulfoxonium salts or selenium salts. Examples of suitable onium salts are disclosed, for example, in U.S. Pat. Nos. 4,442,197; 4,603,101; and 4,624,912. Sulfonium salts such as triphenylsulfonium hexafluorophosphate and mixtures thereof are preferred.

The sulfonated esters useful as photoacid generators in the present invention include, for example, sulfonyloxy ketones. Suitable sulfonated esters include, but are not limited to, benzoin tosylate, t-butylphenyl alpha-(p-toluenesulfonyloxy)-acetate, 2,6-dinitrobenzyl tosylate, and t-butyl alpha-(p-toluenesulfonyloxy)-acetate. Such sulfonated esters are disclosed, for example, in the *Journal of Photopolymer Science and Technology*, vol. 4, No. 3, 337-340 (1991).

Substituted hydroxyimides which can be used include, for example, n-trifluoromethylsulfonyloxy-2,3-diphenylmaleimide and 2-trifluoromethylbenzenesulfonyloxy-2,3-diphenylmaleimide. Suitable substituted hydroxylimines include, for example, 2-(-nitrilo-2-methylbenzylidene)-(5-hydroxyiminobutylsulfonyl)-thiophene. Azides useful in the present invention include, for example, 2,6-(4-azidobenzylidene)cyclohexanone. Naphthoquinones can include, for example, 2,1-diazonaphthoquinone-4-sulfonate ester of 2,3,4-trihydroxybenzophenone. Among the diazo compounds, 1,7-bis (4-chlorosulonyl phenyl)-4-diazo-3,5-heptanedione can be used.

Photobase generators useful in the present invention can be any compound or compounds which liberate base upon exposure to light. Suitable photobase generators include, but are not limited to, benzyl carbamates, benzoin carbamates, O-carbamoylhydroxyamines, O-carbamoyloximes, aromatic sulfonamides, alpha-lactams, N-(2-allylethenyl)amides, arylazide compounds, N-arylformamides, 4-(ortho-nitrophenyl) dihydropyridines, and combinations thereof.

Thermal acid generators useful in the present invention can be any compound or compounds which generate an acid on heat activation. The heat can be supplied by indirect methods such as convection heating or by direct heating methods such as laser heating techniques. Suitable thermal acid generators are known and include, but are not limited to, halogenated triazines, ammonium salts of acids, onium salts, sulfonated esters, substituted hydroxyimides, substituted hydroxylimines, azides, naphthoquinones such as diazonaphthoquinones, diazo compounds, and combinations thereof.

The amount of the component for altering the solubility useful in the present invention, in the case of a negative working material, is any amount sufficient to catalyze coupling of the silicon-containing polymer upon exposure to actinic radiation or heat to render the coupled portion insoluble in an aqueous developer. The active component is present in the composition in an amount of from 0.1 to 25 wt %, for example from 0.1 to 12%.

Other additives may optionally be present in the compositions of the invention including, but are not limited to, flexibilizing agents, surface leveling agents, wetting agents, antifoam agents, adhesion promoters, thixotropic agents, and the like. Such additives are well known in the art for coating compositions. The use of surface leveling agents, for example silicone-base oils such as SILWET L-7604 silicone-base oil available from Dow Chemical Company, in the inventive compositions can be used. It will be appreciated that more than one additive may be combined in the compositions of the present invention. For example, a wetting agent may be combined with a thixotropic agent. Such optional additives are commercially available from a variety of sources. The amounts of such optional additives to be used in the present compositions will depend on the particular additive and desired effect, and are within the ability of those skilled in the art. Such other additives are typically present in the composition in an amount of less than 5 wt %, for example less than 2.5 wt %.

The compositions of the invention can optionally contain one or more organic cross-linking agents. Cross-linking agents include, for example, materials which link up components of the composition in a three-dimensional manner. Aromatic or aliphatic cross-linking agents that react with the silicon-containing polymer are suitable for use in the present invention. Such organic cross-linking agents will cure to form a polymerized network with the silicon-containing polymer, and reduce solubility in a developer solution. Such organic cross-linking agents may be monomers or polymers. It will be appreciated by those skilled in the art that combinations of cross-linking agents may be used in the present invention.

Suitable organic cross-linking agents useful in the present invention include, but are not limited to: amine containing compounds, epoxy containing materials, compounds containing at least two vinyl ether groups, allyl substituted aromatic compounds, and combinations thereof. Typical cross-linking agents include amine containing compounds and epoxy containing materials.

The amine containing compounds useful as cross-linking agents in the present invention include, but are not limited to: melamine monomers, melamine polymers, alkylolmethyl melamines, benzoguanamine resins, benzoguanamine-formaldehyde resins, urea-formaldehyde resins, glycoluril-formaldehyde resins, and combinations thereof.

It will be appreciated by those skilled in the art that suitable organic cross-linker concentrations will vary with factors such as cross-linker reactivity and specific application of the composition. When used, the cross-linking agent(s) is typically present in the composition in an amount of from 0.1 to 50 wt %, for example, from 0.5 to 25 wt % or from 1 to 20 wt %.

The present compositions can optionally and typically contain one or more solvents. Such solvents aid in formulating the present compositions and in coating the present compositions on a substrate. A wide variety of solvents may be used. Suitable solvents include, but are not limited to, glycol ethers, such as ethylene glycol monomethyl ether, propylene glycol monomethyl ether, dipropylene glycol monomethyl ether; esters such as methyl cellosolve acetate, ethyl cellosolve acetate, propylene glycol monomethyl ether acetate, dipropylene glycol monomethyl ether acetate, dibasic esters, carbonates such as propylene carbonate, γ-butyrolactone, esters such as ethyl lactate, n-amyl acetate and n-butyl acetate, alcohols such as n-propanol, iso-propanol, ketones such as cyclohexanone, methyl isobutyl ketone, diisobutyl ketone and 2-heptanone, lactones such as γ-butyrolactone and γ-caprolactone, ethers such as diphenyl ether and anisole, hydrocarbons such as mesitylene, toluene and xylene, and heterocyclic compounds such as N-methyl-2-pyrrolidone, N,N'-dimethylpropyleneurea, or mixtures thereof.

The compositions of the present invention can be prepared by combining, in admixture, the silicon-containing polymer, the component for altering the solubility, and other optional components in any order.

In accordance with a further aspect of the invention, the photosensitive compositions of the invention may be used to form dry-films which find use, for example, as an optical layer or a photoresist. Thus, the dry-films are suitable for use in forming the waveguide structures described below or a photoresist pattern. The dry-films include a releasable carrier substrate and a photosensitive or non-photosensitive polymeric layer over the carrier substrate. The polymeric layer is formed from a composition as described above. The dry film typically includes a protective cover layer on the front surface of the dry-film over the polymeric layer.

The carrier substrate functions as a mechanical support for the polymeric layer and any other layers of the dry-film during manufacture, storage and subsequent processing. Suitable carrier substrate materials include, for example: polyethylene terephthalate (PET), which may be treated in various ways, for example, resin-coated, flame or electrostatic discharge-treated, or slip-treated; a paper such as polyvinyl alcohol-coated paper, crosslinked polyester-coated paper, polyethylene-coated paper, cellulose paper, or a heavy paper such as lithographic paper; nylon; glass; cellulose acetate; a synthetic organic resin; a polyolefin such as polypropylene; a polyimide; a polyurethane; a polyacrylate such as polymethylmethacrylate (PMMA); fiberboard; a metal such as copper, aluminum, tin, magnesium, zinc, nickel, or an alloy thereof; and a multilayered structure of two or more of these or other materials, for example, a copper-coated fiberboard or epoxy laminate. The carrier substrate typically has a thickness, for example, of from about 25 to 250 µm.

The protective cover layer provides protection to the polymeric layer, and is typically in the form of a removable film or sheet that may be peeled from the remainder of the dry-film. Adhesion of the protective cover layer to the polymeric layer is less than that of the carrier substrate to the polymeric layer. This allows for separation of the protective cover layer from the polymeric layer without also separating the polymeric layer from the carrier substrate. Suitable materials for the protective cover layer include, for example, polyolefins such as polyethylene and polypropylene, polyvinyl alcohol, and PET. The protective cover layer typically has a thickness of from about 10 to 100 µm. Optionally, the protective cover layer may include a first layer coated with a release layer which contacts the polymeric layer. Suitable release layer materials include, for example, thermally or photochemically cured silicones, polyvinyl stearate, polyvinyl carbamates, poly N-ethylperfluorooctyl sulfanamidoethyl methacrylate, poly (tetrafluorothylene), polypropylene, polymethyl methacrylate, polysiloxanes, polyamides, and other release materials such as those described in Satas, *Handbook of Pressure Sensitive Adhesive Technology*, $2^{nd}$ ed., Van Nostrand/Reinhold (1989).

The dry-films may be prepared, for example, by coating a composition as described above onto a carrier substrate, for example, by meniscus coating, spray coating, roller coating, wire roll coating, doctor blade coating, curtain coating and the like, typically to a dry thickness of from 5 to 150 microns. The coated carrier substrate may be dried, for example, by convection drying, infrared drying, air drying and the like, typically to a solvent content of from 0 to 10 wt %, typically less than 5 wt % or from 2 to 5 wt %, based on the polymeric layer. The carrier substrate may be in the form of discrete sheets, typically from 2 to 150 cm in width and from 2 to 150 cm in length, which may be coated and dried as sheets and stacked. The carrier sheet may further be in the form of a roll, typically from 2 to 150 cm in width and from 0.5 to 1000 meters in length, which may be coated and dried in a reel-to-reel format, commonly known as a web coating process. The protective cover layer may be applied, for example, by lamination with or without heat and/or pressure. The protective cover sheet is peeled away from the dry-film, and the dry-film is affixed to a substrate (e.g., electronic substrate), for example, by lamination. The polymeric layer may then be imaged and patterned in the case of a photosensitive composition or thermally cured in the case of a non-photosensitive material. Depending on its material of construction, the dry-film carrier substrate is removed from the polymeric layer before or after exposure.

In accordance with a further aspect of the invention, an optical waveguide may be formed from the above-described polymers and compositions. The waveguide includes a core and a clad. The core and/or the clad are formed from a composition such as described above. In one aspect of the invention, a waveguide is formed from the inventive composition by depositing core and cladding layers, wherein the cladding has a lower index of refraction as compared to the core.

The waveguides of the present invention may be manufactured as individual waveguides or as an array of waveguides. For purposes of example only, a method of forming an optical waveguide having clad and core structures formed from the inventive compositions will be described. A waveguide is formed by depositing core and first and second cladding layers. The clad of the final structure has a lower index of refraction as compared to the core. Particularly useful waveguides include a core having an index of refraction of from 1.4 to 1.7 and a cladding having an index of refraction of from 1.3 to 1.69. The waveguides of the present invention may be manufactured from the described compositions by such well known methods as laser ablation, mold technology, indentation technology or by lithographic methods.

Any substrate suitable for supporting a waveguide may be used in this aspect of the invention. Suitable substrates include, but are not limited to, substrates used in the manufacture of electronic devices such as printed wiring boards and integrated circuits. Particularly suitable substrates include laminate surfaces and copper surfaces of copper clad boards, copper foils, printed wiring board inner layers and outer layers, wafers used in the manufacture of integrated circuits such as silicon, gallium arsenide, and indium phosphide wafers, glass substrates including but not limited to liquid crystal display ("LCD") glass substrates, and substrates that include dielectric coatings, cladding layers, and the like.

A first cladding layer can be formed on the substrate surface. The first cladding layer (as well as the other waveguide layers to be described) may be formed from the compositions of the invention, by any technique including, but not limited to, screen printing, curtain coating, roller coating, slot coating, spin coating, flood coating, electrostatic spray, spray coating, or dip coating. When the compositions of the present invention are spray coated, a heated spray gun may optionally be used. The viscosity of the composition may be adjusted to meet the requirements for each method of application by viscosity modifiers, thixotropic agents, fillers and the like. The first cladding layer is typically deposited to a thickness in the dried state of from about 1 to 100 µm, for example, from about 10 to 50 µm.

The first cladding layer can be cured, for example, thermally or photolytically depending on the type of active component in the first cladding composition. The thermal curing temperature is typically from 90 to 300° C., for example from 90 to 220° C. Such curing typically occurs over a period of from five seconds to one hour. Such curing may be affected by heating the substrate in an oven or on a hot plate. Alternatively the waveguide clad can be flood exposed, for example, with 1 to 2 Joules/$cm^2$ Of actinic radiation followed by the thermal cure from 90 to 300° C., for example from 90 to 220° C.

A core layer formed from a composition according to the invention is formed on the first clad layer. The core layer is typically photoimageable and thus, the composition should include a photoactive component such as a photoacid or photobase generator. The core layer is typically coated to a thickness in the dried state of from about 1 to 100 µm, for example, from about 8 to 60 µm. The coated substrate is then soft cured, such as by baking, to remove solvent in the coating. Such curing may take place at various temperatures, depending upon the particular solvent chosen. Suitable temperatures are any that are sufficient to substantially remove any solvent present. The soft curing may be at any temperature from room temperature (25° C.) to 300° C., depending, for example, on the substrate and the thermal budget. Such curing can occur, for example, over a period of from 5 seconds to 60 minutes in an oven or on a hot plate.

After curing, the core layer may be imaged by exposure to actinic radiation. Such methods include, for example, contact imaging, projection imaging, and laser direct write imaging, including laser direct write imaging by multiphoton absorption. Multiphoton absorption can, if desired, be used to form 3-dimensional structures within the layer. The exposure pattern as defined, for example, by a photomask mask defines the geometry of the core waveguide, which is typically but not necessarily on the order of centimeters to meters in length, and microns to hundreds of microns in width. Following exposure, the composition can be post exposure cured, typically at a temperature of from 40 to 170° C. Curing time may vary but is generally from about 30 seconds to 1 hour. While not intending to be bound by theory, it is believed that, in the case of a negative-working material, upon exposure to actinic radiation the silicon-containing polymer couples, rendering the exposed areas less soluble in a developer solution than the unexposed areas.

The unexposed areas may be removed, such as by contact with a suitable developer, leaving only the exposed areas remaining on the substrate, thus forming defined core structures. The composition is advantageously developable in an aqueous developer solution. Suitable aqueous developers include, for example, alkali metal hydroxides such as sodium hydroxide and potassium hydroxide in water, as well as tetraalkylammonium hydroxide such as tetramethylammonium hydroxide, in water. Such developers are typically used in concentrations from 0.1 to 2N, for example, 0.15 to 1N, or 0.26 to 0.7N. Alternatively, the unexposed areas may be removed by contact with non-aqueous developers. Suitable developers include, for example, alcohols, such as $C_1$-$C_{10}$ alcohols and their isomers, $C_1$-$C_{10}$ ketones, $C_1$-$C_{10}$ esters, $C_1$-$C_{10}$ substituted or unsubstituted hydrocarbons, and combinations hereof. The developer solutions may optionally include one or more known surfactants, such as polyethylene glycol, alkyl sulfonates, and other surfactants well known in the art. The surfactant is typically present in the developer in an amount of from 0.01 to 3 wt %. Antifoaming agents may also be advantageously included in the developer.

Development may be at a variety of temperatures such as from room temperature to about 65° C., for example from 21 to 49° C. Development time with mild or aggressive agitation can be within ten minutes, for example, within five minutes, within two minutes, within one minute, or within 30 seconds. Development can take place, for example, in a static development chamber or on a conveyorized platform upon which developer is sprayed. Spray pressures can range from 5 to 40 psi, for example, from 10 to 25 psi.

Following development, the present waveguides may undergo a final cure step. The curing can, for example, include a flood exposure, for example, with 1 to 2 Joules/cm$^2$ Of actinic radiation. Additionally, or alternatively, the waveguides may be heated at a temperature of from about 1300 to 300° C. in air or an inert atmosphere such as nitrogen or argon.

Next, a second cladding layer can be formed as described above over the first cladding layer and core structure. The second cladding layer may be the same or different from the first cladding layer. The second cladding layer can be thermally activated and/or photo activated to provide a waveguide structure as described above with respect to the first clad layer. The second cladding layer is typically deposited to a dried thickness of from about 1 to 100 μm, for example, from about 10 to 50 μm.

Optical waveguides of the present invention possess excellent transparencies at a variety of wavelengths. Thus, the present optical waveguides may be used at, for example, 600 to 1700 nm. It will be appreciated that the present optical waveguides may be advantageously used at other wavelengths. Thus, the present optical waveguides are particularly suited for use in data communications and telecommunications applications.

The optical waveguides of the invention can be used in forming optoelectrical devices including, but not limited to, splitters, couplers, spectral filters, polarizers, isolators, multiplexers such as wavelength division multiplexing structures, amplifiers, attenuators, switches, and the like or, on a larger scale, in electronic devices such as printed wiring boards, integrated circuits, interconnects, and the like. FIG. 1 illustrates an exemplary electronic device in accordance with a further aspect of the invention. The electronic device is an optical splitter that includes a waveguide core 6' formed on a first waveguide clad layer 4. A second clad layer is typically formed over the first clad layer and core. An input of signal wavelength λ is split at the Y-junction 12 into two light signals λ' of equal wavelength but at a reduced power amplitude.

The present compositions are also particularly useful in manufacturing display devices including lenses as well as optical elements such as mirrors, prisms and connectors. As used herein, the term electronic device is intended to encompass optoelectronic devices, for example, those described above, as well as the aforementioned larger scale devices that include an optoelectronic device.

Optical waveguides formed using the polymers and compositions of the present invention are able to endure thermal stresses encountered during use as well as those subjected during standard thermal cycling tests such as Telcordia GR-1221-CORE 6.2.7, (January 1999) (CO), without cracking, lifting, delaminating, or having surface defects or increased optical loss. The Telcordia thermal standard test involves exposing the sample (waveguide or waveguide layer) to 100 temperature cycles of extreme temperatures of −40° C. (±2° C.) for 15 minutes and 70° C. (±2° C.) for 15 minutes or more. A pause at room temperature (20-25° C.) during the transition between extremes is optional.

The following examples are intended to illustrate further various aspects of the present invention, but are not intended to limit the scope of the invention in any aspect.

For purposes of the examples, amounts for the various components are given in weight % based on the entire composition including solvent.

1. Polymer Synthesis

COMPARATIVE EXAMPLE 1

The components listed below were added to a three-neck round bottom flask equipped with a mechanical stirrer, thermometer and condenser. The flask was placed in an oil bath heated to 90° C. for 3 hours, while the mixture stood at a temperature of approximately 78° C. and refluxing occurred. The condenser was removed and replaced with a Dean-Stark trap. The oil bath was heated to 120° C. after which distillation began. When the temperature of the mixture reached 88° C., 300 ml of ethanol was added to the mixture. The oil bath was removed and the mixture was allowed to cool to room temperature. The mixture was passed through an ion exchange column (~5 cm diameter by 50 cm long) containing GR-150 resin (Rohm and Haas Company, Philadelphia, Pa. USA) for approximately 45 minutes. The mixture was placed in a round bottom flask and placed on a rotary evaporator at 40° C. under water pump aspiration for approximately 40 to 50 minutes to remove the solvents until removal was visibly complete.

| | |
|---|---|
| water | 52.86 g |
| 0.1N HCl | 0.25 g |
| $C_6H_5$—Si$(OC_2H_5)_3$ | 120 g |
| $CH_3$—Si$(OC_2H_5)_3$ | 82.02 g |

EXAMPLE 1

The procedure of Comparative Example 1 was repeated, except the components added to the round bottom flask included the following:

| | |
|---|---|
| water | 52.86 g |
| 0.1N HCl | 0.25 g |
| $C_6H_5$—Si$(OC_2H_5)_3$ | 120 g |
| $CH_3$—Si$(OC_2H_5)_3$ | 82.02 g |
| $CH_3OSi(CH_3)_2OSi(CH_3)_2OCH_3$ | 22.83 g |

EXAMPLES 2-4

The procedure of Comparative Example 1 is repeated, except the components added to the round bottom flask are as follows:

Example 2

| | |
|---|---|
| water | 52.86 g |
| 0.1N HCl | 0.25 g |
| $C_6H_5$—Si$(OC_2H_5)_3$ | 120 g |
| $CH_3$—Si$(OC_2H_5)_3$ | 82.02 g |
| $CH_3OSi(CH_3)_2OSi(CH_3)_2OCH_3$ | 31.62 g |

Example 3

| | |
|---|---|
| water | 52.86 g |
| 0.1N HCl | 0.25 g |
| $C_6H_5$—Si$(OC_2H_5)_3$ | 160.8 g |
| $CH_3$—Si$(OC_2H_5)_3$ | 58.70 g |
| $CH_3OSi(CH_3)_2OSi(CH_3)_2OCH_3$ | 22.69 g |

Example 4

| | |
|---|---|
| water | 52.86 g |
| 0.1N HCl | 0.25 g |
| $C_6F_5$—Si$(OC_2H_5)_3$ | 120 g |
| $CH_3$—Si$(OC_2H_5)_3$ | 82.02 g |
| $CH_3OSi(CH_3)_2OSi(CH_3)_2OCH_3$ | 31.62 g |

2. Optical Waveguide Compositions

COMPARATIVE EXAMPLE 2

40.75 wt % propylene glycol monomethyl ether acetate, 53.76 wt % of the polymer of Comparative Example 1, 5.38 wt % polytetrahydrofurane, 0.11 wt % diphenylnaphthylsulfonium perfluorobutanesulfonate, and 0.01 wt % Dow SILWET L-7604 silicone-base oil were combined in admixture. The composition was coated onto pumice scrubbed copper clad laminate. The coated laminate was dried in an oven at 90° C. for 30 minutes to a dried thickness of 125 µm. The coated laminate was exposed at 500 mJ/cm$^2$ and then heated in air in a convection oven at a first temperature of 90° C. for 15 minutes, and then 200° C. for 60 minutes. The coated laminate was cut into a 2 inch by 6 inch panel which was placed in a Thermotron ATS-195-V-5-5, two zone (air to air) thermal shock chamber (Thermotron Industries, Holland, Mich.). The top chamber was heated to 75° C. and the bottom chamber was cooled to −40° C. The panel was exposed to each temperature extreme for 15 minutes with a 2 minute travel time between the chambers. After 50 cycles, the panel was observed to have a multitude of cracks running along the full length of the panel.

EXAMPLE 5

The procedure of Comparative Example 2 was repeated, except the components added to the round bottom flask were 50 wt % propylene glycol monomethyl ether acetate, 44.88 wt % of the polymer of Example 1, 5 wt % polytetrahydrofurane, 0.11 wt % diphenyl naphthyl sulfonium perfluoro butane sulfonate, and 0.01 wt % Dow SILWET L-7604 silicone-base oil. After 100 cycles in the thermal shock chamber, no cracks, delamination or surface defects were observed.

EXAMPLES 6-8

The procedure of Example 5 is repeated, except the polymer of Examples 2-4, respectively, is used in place of the polymer of Example 1. It is expected that after 100 cycles in the thermal shock chamber, no cracks, delamination or surface defects would be observed.

3. Optical Waveguide Formation

EXAMPLES 9-12

A first cladding layer composition is formed by combining in admixture 50 wt % propylene glycol monomethyl ether acetate, 44.88 wt % of the polymer from Examples 1-4 (for Examples 9-12, respectively), 5 wt % polytetrahydrofurane, 0.11 wt % diphenylnaphthylsulfonium perfluoro butane sulfonate, and 0.01 wt % Dow SILWET L-7604 silicone-base oil. The composition is spin-coated at 2000 rpm onto a six-inch silicon dioxide-coated silicon wafer and soft-baked in air on a hot plate for two minutes at 90° C., to a thickness of 7 µm. The composition is hard-baked in air on a hot plate for ten minutes at 200° C.

The first cladding layer is coated with a core layer composition that is formed by combining in admixture 50 wt % propylene glycol monomethyl ether acetate, 42 wt % of the polymer from Examples 1-4 (for Examples 9-12, respectively), 10 wt % polydiphenylsiloxane, 2.99 wt % triphenylsulfonium hexafluorophosphate, and 0.01 wt % Dow SILWET L-7604 silicone-base oil. The composition is spin-coated at 2000 rpm and is soft-baked in air on a hot plate for two minutes at 90° C., to a thickness of 8 μm.

Artwork defining the required waveguide is placed directly on the composition. The artwork includes patterns for forming waveguides of various dimensions and shapes, such as linear, branched, and curved shaped waveguides between 2 and 14 cm in length and 5 to 15 μm in length. 800 mJ/cm$^2$ Of actinic radiation is applied to the construction followed by a post-exposure-bake in air at 90° C. for two minutes. The exposed wafer is then dipped in a 0.7N sodium hydroxide developer solution held at 37.8° C. (100° F.) for 30 seconds. The wafer is rinsed in de-ionized water and dried.

A second cladding layer composition is formed over the patterned core and first cladding layer using the same composition and procedures for forming the first cladding layer, except the thickness of the second cladding layer after the soft-bake is 10 μm. Optical waveguides are thereby formed.

It is expected that after 100 cycles in the thermal shock chamber under the conditions described in Comparative Example 2, no cracks, delamination or surface efects would be observed in the waveguides.

What is claimed is:

1. A composition suitable for use in forming an optical waveguide, comprising:
   a condensation product of reactants comprising a first reactant of the formula $RSi(OR^1)_3$ and a second reactant of the formula $R^2O(R^3_2Si-O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more; and
   a photoactive component, wherein the photoactive component is a photoacid generator or a photobase generator.

2. The composition according to claim 1, wherein the composition in a dried state is developable in a developer solution.

3. The composition according to claim 1, wherein $R^3$ is methyl and x is 2.

4. A dry-film formed from the composition according to claim 1, comprising:
   a carrier substrate having a front surface and a back surface;
   a polymeric layer over the front surface of the carrier substrate, comprising:
      a condensation product of reactants comprising a first reactant of the formula $RSi(OR^1)_3$ and a second reactant of the formula $R^2O(R^3_2Si-O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more; and a photoactive component.

5. The composition according to claim 1, wherein the reactants further comprise a third reactant of the formula $R^5Si(OR^6)_3$, wherein $R^5$ and $R^6$ are chosen from substituted and unsubstituted aliphatic, aromatic, and aralkyl groups, and wherein R and $R^5$ are different.

6. An optical waveguide comprising a core and a clad, wherein the core and/or the clad are formed from a composition comprising: a polymer comprising a condensation product of reactants comprising a first reactant of the formula $RSi(OR^1)_3$ and a second reactant of the formula $R^2O(R^3_2Si-O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more; and a photoactive component.

7. The optical waveguide according to claim 6, wherein $R^3$ is methyl and x is 2.

8. The optical waveguide according to claim 6, wherein the optical waveguide has an optical loss which does not increase after undergoing 100 temperature cycles of extreme temperatures of −40° C.±2° C. for 15 minutes and 70° C.±2° C. for 15 minutes or more, optionally with a pause at 20 to 25° C. during transition between extremes.

9. A method of forming an optical waveguide, comprising:
   providing a composition comprising: a polymer comprising a condensation product of reactants comprising a first reactant of the formula $RSi(OR^1)_3$ and a second reactant of the formula $R^2O(R^3_2Si-O)_xR^4$, wherein R, $R^1$, $R^2$, $R^3$ and $R^4$ are chosen from substituted and unsubstituted aliphatic, aromatic, and aralkyl groups, R is free of hydrolyzable Si—O, and x is 2 or more; and a photoactive component; and
   forming a core and a clad on a substrate, wherein the core and/or the clad are formed from the composition.

10. The method according to claim 9, wherein $R^3$ methyl and x is 2.

11. The method according to claim 9, wherein forming of the core and the clad on the substrate comprises:
   forming a first clad layer on the substrate;
   forming a core layer on the first clad layer;
   patterning the core layer; and
   forming a second clad layer on the first clad layer and patterned core layer.

* * * * *